US012621091B2

(12) United States Patent　　　(10) Patent No.: US 12,621,091 B2
Fu　　　(45) Date of Patent: May 5, 2026

(54) METHOD AND APPARATUS FOR TRANSMITTING PHYSICAL DOWNLINK SHARED CHANNEL, AND READABLE STORAGE MEDIUM

(71) Applicant: Beijing Xiaomi Mobile Software Co., Ltd., Beijing (CN)

(72) Inventor: Ting Fu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 337 days.

(21) Appl. No.: 18/553,113

(22) PCT Filed: Mar. 29, 2021

(86) PCT No.: PCT/CN2021/083625
§ 371 (c)(1),
(2) Date: Sep. 28, 2023

(87) PCT Pub. No.: WO2022/204881
PCT Pub. Date: Oct. 6, 2022

(65) Prior Publication Data
US 2024/0380530 A1　　Nov. 14, 2024

(51) Int. Cl.
*H04L 5/00* (2006.01)
*H04W 72/044* (2023.01)
*H04W 72/232* (2023.01)

(52) U.S. Cl.
CPC ......... *H04L 5/0012* (2013.01); *H04W 72/044* (2013.01); *H04W 72/232* (2023.01)

(58) Field of Classification Search
CPC ..... H04L 5/0012; H04L 5/001; H04L 5/0044; H04W 72/044; H04W 72/232; H04W 72/1273
See application file for complete search history.

(56) References Cited

U.S. PATENT DOCUMENTS

| | | | |
|---|---|---|---|
| 2020/0314881 A1* | 10/2020 | Bagheri | H04W 72/23 |
| 2021/0029731 A1 | 1/2021 | Kundu et al. | |
| 2021/0076384 A1* | 3/2021 | MolavianJazi | H04W 72/0453 |
| 2021/0298029 A1* | 9/2021 | Liu | H04W 72/0453 |
| 2022/0124768 A1* | 4/2022 | Frenne | H04L 5/0044 |
| 2022/0256571 A1* | 8/2022 | Lo | H04L 1/0045 |

(Continued)

FOREIGN PATENT DOCUMENTS

| | | |
|---|---|---|
| CN | 110351853 A | 10/2019 |
| CN | 110612765 A | 12/2019 |

(Continued)

OTHER PUBLICATIONS

International Search Report Issued Dec. 30, 2021, in PCT/CN2021/083625, filed on Mar. 29, 2021, 3 pages.

(Continued)

*Primary Examiner* — Christine Ng
(74) *Attorney, Agent, or Firm* — Oblon, McClelland, Maier & Neustadt, L.L.P.

(57) ABSTRACT

A method for transmitting physical downlink shared channel (PDSCH) includes: sending, by a network device based on a frequency hopping rule and multiple available downlink (DL) resource block (RB) sets in a DL bandwidth pad (BWP), multiple PDSCHs scheduled by downlink control information (DCI) in a first format to a user equipment (UE).

14 Claims, 3 Drawing Sheets

Network device 102

User equipment 101

S21. On the basis of a plurality of available downlink resource block sets in a downlink bandwidth part, and a frequency hopping rule, send, to the user equipment, a plurality of physical downlink shared channels (PDSCHs) scheduled by downlink control information (DCI) in a first format S22. On the basis of the plurality of available downlink resource block sets in the downlink bandwidth part, and the frequency hopping rule, receive, from the network device, the plurality of PDSCHs scheduled by the DCI in the first format

(56)             References Cited

U.S. PATENT DOCUMENTS

| | | | | |
|---|---|---|---|---|
| 2022/0304023 A1* | 9/2022 | Zhang | .................. | H04L 5/0037 |
| 2023/0084494 A1* | 3/2023 | Wei | ..................... | H04L 5/0044 |
| | | | | 370/329 |
| 2023/0354362 A1* | 11/2023 | Xu | ................... | H04W 72/1263 |
| 2023/0371035 A1* | 11/2023 | Li | .................... | H04W 72/0446 |

FOREIGN PATENT DOCUMENTS

| | | | |
|---|---|---|---|
| CN | 110710318 A | 1/2020 |
| WO | WO 2020/227068 A1 | 11/2020 |

OTHER PUBLICATIONS

NEC et al. "WF on number of narrowbands for M-PDCCH and PDSCH frequency hopping", 3GPP TSG RAN WG1 Meeting #82bis RI-156321, Oct. 9, 2015, 4 pages.
Intel Corp. "Discussion on PDCCH monitoring enhancements for extending NR up to 71 GHz", 3GPP TSG RAN WG1 Meeting #104-e RI-2100644, Feb. 5, 2021, 6 pages.

* cited by examiner

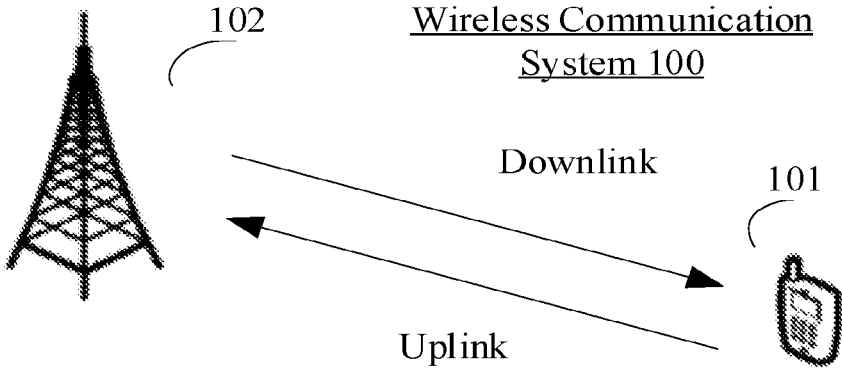

102

Wireless Communication
System 100

Downlink

101

Uplink

FIG. 1

| Network device 102 | User equipment 101 |
|---|---|

S21. On the basis of a plurality of available downlink resource
block sets in a downlink bandwidth part, and a frequency
hopping rule, send, to the user equipment, a plurality of
physical downlink shared channels (PDSCHs) scheduled by
downlink control information (DCI) in a first format S22. On the basis of the plurality of
available downlink resource block sets in
the downlink bandwidth part, and the
frequency hopping rule, receive, from the
network device, the plurality of PDSCHs
scheduled by the DCI in the first format

METHOD AND APPARATUS FOR TRANSMITTING PHYSICAL DOWNLINK SHARED CHANNEL, AND READABLE STORAGE MEDIUM

CROSS REFERENCE TO RELATED APPLICATION

This application is a National Stage of International Application No. PCT/CN2021/083625, filed on Mar. 29, 2021, which is incorporated by reference herein in its entireties for all purposes.

TECHNICAL FIELD

Description of the Related Art

Currently, in new radio (NR), downlink data is carried on physical downlink shared channel (PDSCH), and uplink data is carried on physical uplink shared channel (PUSCH). The base station schedules PDSCH and PUSCH through downlink control information (DCI) carried on physical downlink control channel (PDCCH).

In order to ensure the flexibility of scheduling, one DCI can schedule one PDSCH or one PUSCH.

When the sub-carrier space (SCS) is 960 khz, the corresponding time slot duration is $\frac{1}{64}$ ms. When the SCS is large and the time slot duration is small, if each PDSCH is scheduled by using a separate DCI, the overhead of blind DCI detection will be too heavy.

In the design of multi-TTI (multi transmission time interval), one DCI can schedule PDSCH or PUSCH over multiple time slots. An example in a multi-TTI PDSCH scheduling scenario is given below for illustration. One DCI can schedule 4 PDSCHs, and the 4 PDSCHs correspond to 4 time slots or 4 PDSCH transmission opportunities, respectively. The 4 PDSCHs may be used to transmit different data, that is, to transmit different transport blocks (TBs). The number of DCIs can be reduced based on the design of multi-TTI, thereby reducing the complexity of UE blindly detecting DCIs. Herein, in the multi-TTI PDSCH scheduling scenario, the number of PDSCHs scheduled by one DCI may be semi-statically configured by the high layer, or may be dynamically indicated by a scheduling DCI based on a value range indicated by the protocol or configured by a high-layer signaling.

SUMMARY

This disclosure relates to the field of wireless communication technologies, and in particular, to a method, an apparatus and a readable storage medium for transmitting a physical downlink shared channel (PDSCH).

In view of above, some embodiments of this disclosure propose a method, an apparatus, and a readable storage medium for transmitting PDSCH.

In a first aspect, some embodiments of this disclosure provide a method for transmitting PDSCH, where the method is performed by a network device or performed by a chip in the network device. The network device may include an access network device, such as a base station, a nodeB, and the like.

The method includes: sending, based on a frequency hopping rule and multiple available downlink (DL) resource block (RB) sets in a DL bandwidth part (BWP), multiple PDSCHs scheduled by downlink control information (DCI) in a first format to a user equipment (UE).

In a second aspect, some embodiments of this disclosure provide a method for transmitting PDSCH, where the method is performed by a network device or performed by a chip in the network device. The network device may be a mobile phone.

The method includes receiving, based on a frequency hopping rule and multiple available DL RB sets in a DL BWP, multiple PDSCHs scheduled by DCI in a first format from a network device.

In a third aspect, some embodiments of this application provides a communication device. The communication device may be configured to perform the steps performed by the network device in the first aspect or any possible embodiments thereof. The network device may implement each function in the above-mentioned methods in the form of a hardware structure, a software module, or a combination of hardware structure and software module.

When the communication device described in the third aspect is implemented by a software module, the communication device may include a communication module and a processing module coupled with each other, where the communication module may be configured to support communications of the communication device, and the processing module may be configured to perform processing operations of the communication device, such as generating information/messages to be sent, or obtaining information/messages by processing received signals.

When performing the steps described in the first aspect, a transceiver module is configured to send, based on a frequency hopping rule and multiple available DL RB sets in a DL BWP, multiple PDSCHs scheduled by DCI in a first format to UE.

In a fourth aspect, some embodiments of this application provides a communication device. The communication device may be configured to perform the steps performed by UE in the second aspect or any possible embodiments thereof. UE may implement each function in the above-mentioned methods in the form of a hardware structure, a software module, or a combination of hardware structure and software module.

When the communication device described in the fourth aspect is implemented by a software module, the communication device may include a communication module and a processing module coupled with each other, where the communication module may be configured to support communications of the communication device, and the processing module may be configured to perform processing operations of the communication device, such as generating information/messages to be sent, or obtaining information/messages by processing received signals.

When performing the steps described in the second aspect above, a transceiver module is configured to receive, based on a frequency hopping rule and multiple available DL RB sets in a DL BWP, multiple PDSCHs scheduled by DCI in a first format from a network device.

In a fifth aspect, this disclosure provides a communication system, which may include the communication device described in the third aspect and the communication device described in the fourth aspect, where the communication device described in the third aspect may be composed of software modules and/or hardware components, and the communication device described in the fourth aspect may be composed of software modules and/or hardware components.

In a sixth aspect, this disclosure provides a communication device, including a processor and a memory. The memory is configured to store a computer program. The processor is configured to execute the computer program, thereby implementing the first aspect or any possible embodiments thereof.

In a seventh aspect, this disclosure provides a communication device including a processor and a memory. The memory is configured to store a computer program; the processor is configured to execute the computer program, thereby implementing the second aspect or any possible embodiments thereof.

In an eighth aspect, this disclosure provides a non-transitory computer-readable storage medium, with instructions (or computer programs, programs) being stored thereon, which, when invoked and executed on a computer, cause the computer to implement the first aspect or any possible embodiments thereof.

In a ninth aspect, this disclosure provides a non-transitory computer-readable storage medium, with instructions (or computer programs, programs) being stored thereon, which, when invoked and executed on a computer, cause the computer to implement the second aspect or any possible embodiments thereof.

For the beneficial effects of the above-mentioned second to ninth aspects and possible embodiments thereof, reference may be made to the description of the beneficial effects of the method in the first aspect and any possible embodiments thereof.

It is to be understood that the foregoing general description and the following detailed description are exemplary and explanatory only and are not restrictive of this disclosure.

BRIEF DESCRIPTION OF THE DRAWINGS

The accompanying drawings described herein are used to provide a further understanding of some embodiments of this disclosure, and constitute a part of this disclosure. The illustrative examples and descriptions of some embodiments of this disclosure are used to explain the embodiments of this disclosure without constituting any improper limitations on the embodiments of this disclosure.

FIG. 1 is a structural diagram of a wireless communication system according to an exemplary embodiment;

FIG. 2 is a flowchart of a method for transmitting PDSCH according to an exemplary embodiment;

DETAILED DESCRIPTION OF THE PREFERRED EMBODIMENTS

Figure 3:
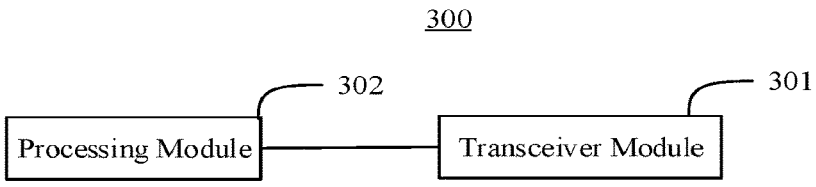
FIG. 3 is a block diagram of an apparatus for transmitting PDSCH according to an exemplary embodiment.

Some embodiments of this disclosure will now be further described with reference to the accompanying drawings and specific embodiments.

Exemplary embodiments will be described in detail herein, examples of which are illustrated in the accompanying drawings. Where the following description refers to the drawings, the same numerals in different drawings refer to the same or similar elements unless otherwise indicated.

The implementations described in the following exemplary embodiments are not intended to represent all implementations consistent with the disclosed embodiments. Rather, they are merely examples of apparatus and methods consistent with some aspects of this disclosure as defined in the appended claims.

As shown in FIG. 1, the method for transmitting PDSCH according to some embodiments of this disclosure may be applied to a wireless communication system 100, and the wireless communication system may include a terminal device 101 and a network device 102. In some embodiments, the terminal device 101 is configured to support carrier aggregation, and the terminal device 101 may be connected to multiple carrier units of the network device 102, including one primary carrier unit and one or more secondary carrier units.

It should be understood that the above wireless communication system 100 is applicable to both low frequency scenarios and high frequency scenarios. Application scenarios of the wireless communication system 100 include, but are not limited to, long term evolution (LTE) system, LTE frequency division duplex (FDD) system, LTE time division duplex (TDD) system, worldwide interoperability for microwave access (WiMAX) communication system, cloud radio access network (CRAN) system, future 5th-Generation (5G) system, new radio (NR) communication system, future-evolved public land mobile network (PLMN) system, or the like.

The terminal device 101 described above may be a user equipment (UE), a terminal, an access terminal, a terminal unit, a terminal station, a mobile station (MS), a remote station, a remote terminal, a mobile terminal, a wireless communication equipment, a terminal agent, a terminal equipment, or the like. The terminal device 101 may have a wireless transceiver function, which can perform communication (e.g., wireless communication) with one or more network devices of one or more communication systems, and accept network services provided by a network device, where the network device includes, but is not limited to, the network device 102 as illustrated.

The terminal device 101 may be a cellular phone, a cordless phone, a session initiation protocol (SIP) phone, a wireless local loop (WLL) station, a personal digital assistant (PDA) device, a handheld device with wireless communication functions, a computing device or another processing device connected to wireless modems, an in-vehicle device, a wearable device, a terminal device in future 5G networks, a terminal device in future-evolved PLMN networks, or the like.

The network device 102 may be an access network device (or an access network station). The access network device refers to a device that provides a network access function, such as a radio access network (RAN) base station, and the like. The network device 102 may specifically include a base station (BS), or include a base station and a radio resource management device for controlling the base station, and the like. The network device 102 may also include a relay station (relay device), an access point, a base station in a future 5G network, a base station in a future-evolved PLMN network, an NR base station, or the like. The network device 102 may be a wearable device or a vehicle-mounted device. The network device 102 may also be a communication chip with a communication module.

For example, the network device 102 includes, but is not limited to, a next-generation base station (gnodeB, gNB) in 5G, an evolved node B (eNB) in the LTE system, a radio network controller (RNC), a Node B (NB) in WCDMA system, a wireless controller in CRAN system, a base station controller (BSC), a base transceiver station (BTS) in GSM system or CDMA system, a home base station (e.g., home evolved nodeB; or home node B, HNB), a baseband unit (BBU), a transmitting and receiving point (TRP), a transmitting point (TP), mobile switching center, or the like.

When multi-TTI PDSCH scheduling is introduced in the frequency domain of NR from 52.6 to 71 GHz, in the frequency domain resource allocation strategy, multiple PDSCHs scheduled by a single DCI may be introduced to perform frequency hopping in the frequency domain.

In NR-U R16, the concept of resource block set (RB set) was introduced. If the upper layer configures an RB set, then multiple RB sets may be divided in the frequency domain of a bandwidth part (BWP). The network device 102 may indicate to UE which RB sets are available for downlink (DL) reception and which RB sets are unavailable for DL reception, that is, which RB sets are "available" and which RB sets are "unavailable."

In the frequency domain of NR from 52.6 to 71 GHz, when multi-TTI PDSCHs are frequency hopped in a BWP according to a pattern configured by RRC or defined in the protocol, it may cause frequency hopping of one or more PDSCHs, among the multiple PDSCHs scheduled by a single DCI, to an RB set indicated as "unavailable," thereby affecting normal reception of the PDSCH by UE 101.

Some embodiments of this disclosure provide a method for transmitting PDSCH. Referring to FIG. 2, FIG. 2 is a flowchart of a method for transmitting PDSCH according to an exemplary embodiment. As shown in FIG. 2, the method includes following content.

In step S21, the network device 102 sends, based on a frequency hopping rule and multiple available DL RB sets in a DL BWP, multiple PDSCHs scheduled by DCI in a first format to UE 101.

In step S22, UE 101 receives, based on the frequency hopping rule and multiple available DL RB sets in the DL BWP, the multiple PDSCHs scheduled by DCI in the first format from the network device 102.

Some embodiments of this disclosure provides a method for transmitting PDSCH, which is performed by a network device and includes sending, based on a frequency hopping rule and multiple available DL RB sets in a DL BWP, multiple PDSCHs scheduled by DCI in a first format to UE. In some embodiments, the DL BWP is located in an unlicensed spectrum.

In some embodiments, the DCI in the first format is DCI 1-0, DCI 1-1 or DCI 1-2.

In some embodiments, the multiple available DL RB sets are multiple DL RB sets indicated to UE by the network device and available for DL reception.

In some embodiments of this disclosure, the multiple PDSCHs scheduled by the DCI in the first format are sent to UE only on the multiple available DL RB sets in the BWP, and the multiple PDSCHs are respectively mapped to the multiple available RB sets in the BWP based on the frequency hopping rule, thereby avoiding the situation that the PDSCH is mapped to an unavailable RB set according to the frequency hopping rule, so that UE 101 can smoothly receive the multiple PDSCHs scheduled by a single DCI and processed by frequency hopping.

Some embodiments of this disclosure provides a method for transmitting PDSCH, which is performed by a network device and includes determining, based on the frequency hopping rule and multiple available DL RB sets in the DL BWP, positions of resources used for sending the multiple PDSCHs scheduled by the DCI in the first format, and sending, at the positions of resources, the multiple PDSCHs scheduled by the DCI in the first format to UE.

In some embodiments, the positions of resources used for sending the multiple PDSCHs scheduled by the DCI in the first format include multiple positions of resources, and the multiple positions of resources are located in multiple available RB sets.

In some embodiments, the positions of resources used for sending the multiple PDSCHs scheduled by the DCI in the first format include multiple positions of resources, and each position of resource is located in one of the multiple available RB sets.

In some embodiments, the positions of resources are time-frequency positions of resources. For example, the time-frequency position of resource includes one or more OFDM symbols.

In some embodiments of this disclosure, the network device 102 determines positions of resources used for sending the multiple PDSCHs scheduled by the DCI in the first format based on multiple available RB sets in the BWP and the frequency hopping rule, where the positions of resources are positions of resources in the multiple available RB sets of the BWP, so that the multiple PDSCHs scheduled by the DCI in the first format are sent to UE only on the multiple available RB sets in the BWP, thereby avoiding the situation that the PDSCH is mapped to an unavailable RB set according to the frequency hopping rule, so that UE 101 can smoothly receive the multiple PDSCHs scheduled by a single DCI and processed by frequency hopping.

Some embodiments of this disclosure provides a method for transmitting PDSCH, which is performed by a network device and includes determining available RB sets for performing frequency hopping in the BWP based on multiple available DL RB sets in the DL BWP and the frequency hopping rule, and sending, according to the frequency hopping rule on the available RB sets for performing frequency hopping in the BWP, the multiple PDSCHs scheduled by the DCI in the first format to UE.

In some embodiments, the number of available RB sets for performing frequency hopping in the BWP as determined is less than the number of available RB sets in the BWP. In this case, the multiple PDSCHs scheduled by the DCI in the first format are sent to UE on the available part of DL RB sets in the DL BWP according to the frequency hopping rule.

In some embodiments of this disclosure, the multiple PDSCHs scheduled by the DCI in the first format are sent to UE only on the available part of DL RB sets in the BWP, and the multiple PDSCHs are respectively mapped to the multiple available RB sets in the BWP based on the frequency hopping rule, thereby avoiding the situation that the PDSCH is mapped to an unavailable RB set according to the frequency hopping rule, so that UE 101 can smoothly receive the multiple PDSCHs scheduled by a single DCI and processed by frequency hopping.

Some embodiments of this disclosure provides a method for transmitting PDSCH, which is performed by a network device and includes determining available RB sets for performing frequency hopping in the BWP based on multiple available DL RB sets in the DL BWP and the frequency hopping rule, and sending, according to the frequency hopping rule on the available RB sets for performing frequency hopping in the BWP, the multiple PDSCHs scheduled by the DCI in the first format to UE.

In some embodiments, the number of available RB sets for performing frequency hopping in the BWP as determined is equal to the number of available RB sets in the BWP. In other words, the multiple PDSCHs scheduled by the DCI in the first format are sent to UE on all the available DL RB sets in the DL BWP according to the frequency hopping rule.

In some embodiments of this disclosure, the multiple PDSCHs scheduled by the DCI in the first format are sent to UE on all the available DL RB sets in the BWP, and the multiple PDSCHs are respectively mapped to the multiple available RB sets in the BWP based on the frequency hopping rule, thereby avoiding the situation that the PDSCH is mapped to an unavailable RB set according to the frequency hopping rule, so that UE 101 can smoothly receive the multiple PDSCHs scheduled by a single DCI and processed by frequency hopping.

Some embodiments of this disclosure provides a method for transmitting PDSCH, which is performed by a network device and includes sending the DCI in the first format to UE, where the DCI in the first format includes first indication information, and the first indication information is configured to indicate an index of a DL RB set where a headmost PDSCH, in the multiple PDSCHs scheduled by the DCI in the first format, is located, and sending, based on multiple available RB sets in the BWP and the frequency hopping rule, the multiple PDSCHs scheduled by the DCI in the first format to UE.

In some embodiments, the DCI in the first format is DCI 1-0, DCI 1-1 or DCI 1-2.

In some embodiments of this disclosure, the index of the DL RB set where the headmost PDSCH, in the multiple PDSCHs scheduled by the DCI in the first format, is located is indicated by the DCI in the first format, the multiple PDSCHs are respectively mapped to the multiple available RB sets in the BWP based on the frequency hopping rule, and the multiple PDSCHs scheduled by the DCI in the first format are sent to UE only on the multiple available DL RB sets in the BWP, thereby avoiding the situation that the PDSCH is mapped to an unavailable RB set according to the frequency hopping rule, so that UE 101 can smoothly receive the multiple PDSCHs scheduled by a single DCI and processed by frequency hopping.

Some embodiments of this disclosure provides a method for transmitting PDSCH, which is performed by a network device and includes sending, based on multiple available RB sets in the BWP and the frequency hopping rule, the multiple PDSCHs scheduled by the DCI in the first format to UE. The frequency hopping rule is indicated by a predefined field in the DCI in the first format.

In some embodiments, the network device sends the DCI in the first format to UE, where the DCI in the first format includes second indication information for indicating the frequency hopping rule.

In some embodiments, the DCI in the first format is DCI 1-0, DCI 1-1 or DCI 1-2.

In some embodiments of this disclosure, the frequency hopping rule is indicated by the DCI in the first format, the multiple PDSCHs are respectively mapped to the multiple available RB sets in the BWP based on the frequency hopping rule, and the multiple PDSCHs scheduled by the DCI in the first format are sent to UE only on the multiple available DL RB sets in the BWP, thereby avoiding the situation that the PDSCH is mapped to an unavailable RB set according to the frequency hopping rule, so that UE 101 can smoothly receive the multiple PDSCHs scheduled by a single DCI and processed by frequency hopping.

Some embodiments of this disclosure provides a method for transmitting PDSCH, which is performed by a network device and includes sending, based on multiple available RB sets in the BWP and the frequency hopping rule, the multiple PDSCHs scheduled by the DCI in the first format to UE. The frequency hopping rule is configured by a high-layer signaling.

In some embodiments, the network device 102 sends the high-layer signaling to UE 101, where the high-layer signaling includes information for indicating the frequency hopping rule.

In some embodiments of this disclosure, UE 101 acquires, by receiving the high-layer signaling, the frequency hopping rule used by the network device 102 when sending the multiple PDSCHs scheduled by the first DCI.

Some embodiments of this disclosure provides a method for transmitting PDSCH, which is performed by a network device and includes sending, based on multiple available RB sets in the BWP and the frequency hopping rule, the multiple PDSCHs scheduled by the DCI in the first format to UE. The frequency hopping rule is defined in a protocol.

In some embodiments of this disclosure, UE 101 determines, based on the protocol, the frequency hopping rule used by the network device 102 when sending the multiple PDSCHs scheduled by the first DCI, so the network device 102 does not need to send any information indicating the frequency hopping rule through a dedicated signaling or a dedicated field.

Some embodiments of this disclosure provides a method for transmitting PDSCH, which is performed by a network device and includes sending the DCI in the first format to UE, where the DCI in the first format includes first indication information, and the first indication information is configured to indicate an index of a DL RB set where a headmost PDSCH, in the multiple PDSCHs scheduled by the DCI in the first format, is located, and sending, based on multiple available RB sets in the BWP and the frequency hopping rule, the multiple PDSCHs scheduled by the DCI in the first format to UE. The frequency hopping rule includes: determining, according to the first indication information and a cyclic ascending order of indexes of the available DL RB sets, available DL RB sets corresponding to the multiple PDSCHs scheduled by the DCI in the first format. A specific example will be taken for description below.

Example I

The DL BWP consists of 5 DL RB sets in total. The 5 DL RB sets include DL RB set 0, DL RB set 1, DL RB set 2, DL RB set 3, and DL RB set 4. Herein, a total of 3 DL RB sets are indicated as "available", and the 3 available RB sets include DL RB set 0, DL RB set 2, and RB set 4.

The DCI in the first format schedules 4 PDSCHs in total, including PDSCH0, PDSCH1, PDSCH2 and PDSCH3.

The network device sends the DCI in the first format to UE, where the DCI in the first format includes the second indication information indicating the frequency hopping rule and the first indication information, and the first indication information is configured to indicate that an index of an available DL RB set where a headmost PDSCH (i.e., PDSCH0), in the multiple PDSCHs scheduled by the DCI in the first format, is located is 2, that is, indicate that the DL RB set where PDSCH0 is located is DL RB set 2.

According to the index of DL RB set 2 and the cyclic ascending order of indexes of the available DL RB sets, the DL RB sets corresponding to other PDSCHs are determined in the available DL RB sets in the cyclic ascending order as follows:

PDSCH0 corresponds to DL RB set 2,
PDSCH1 corresponds to DL RB set 4,
PDSCH2 corresponds to DL RB set 0,
PDSCH3 corresponds to DL RB set 2.

Some embodiments of this disclosure provides a method for transmitting PDSCH, which is performed by a network device and includes sending the DCI in the first format to UE, where the DCI in the first format includes first indication information, and the first indication information is configured to indicate an index of a DL RB set where a headmost PDSCH, in the multiple PDSCHs scheduled by the DCI in the first format, is located, and sending, based on multiple available RB sets in the BWP and the frequency hopping rule, the multiple PDSCHs scheduled by the DCI in the first format to UE. The frequency hopping rule includes determining, according to the first indication information and a cyclic ascending order of indexes of the available DL RB sets, available DL RB sets corresponding to the multiple PDSCHs scheduled by the DCI in the first format, and the cyclic ascending order of the indexes of the available DL RB sets is a cyclic ascending order of the indexes of the available DL RB sets conforming to a first DL RB set interval.

A specific example will be taken for description below.

Example II

The DL BWP consists of 5 DL RB sets in total. The 5 DL RB sets include DL RB set 0, DL RB set 1, DL RB set 2, DL RB set 3, and DL RB set 4. Herein, a total of 3 DL RB sets are indicated as "available", and the 3 available RB sets include DL RB set 0, DL RB set 2, and RB set 4.

The DCI in the first format schedules 4 PDSCHs in total, including PDSCH0, PDSCH1, PDSCH2 and PDSCH3.

The first DL RB set interval is 1 RB set.

The network device sends the DCI in the first format to UE, where the DCI in the first format includes the second indication information indicating the frequency hopping rule and the first indication information, and the first indication information is configured to indicate that an index of an available DL RB set where a headmost PDSCH (i.e., PDSCH0), in the multiple PDSCHs scheduled by the DCI in the first format, is located is 2, that is, indicate that the DL RB set where PDSCH0 is located is DL RB set 2.

According to the index of DL RB set 2 and the cyclic ascending order of indexes of the available DL RB sets conforming to the first DL RB set interval, the DL RB sets corresponding to other PDSCHs are determined in the available DL RB sets in the cyclic ascending order conforming to the first DL RB set interval as follows:

PDSCH0 corresponds to DL RB set 2,
PDSCH1 corresponds to DL RB set 0,
PDSCH2 corresponds to DL RB set 4,
PDSCH3 corresponds to DL RB set 2.

Some embodiments of this disclosure provides a method for transmitting PDSCH, which is performed by a network device and includes sending the DCI in the first format to UE, where the DCI in the first format includes first indication information, and the first indication information is configured to indicate an index of a DL RB set where a headmost PDSCH, in the multiple PDSCHs scheduled by the DCI in the first format, is located, and sending, based on multiple available RB sets in the BWP and the frequency hopping rule, the multiple PDSCHs scheduled by the DCI in the first format to UE. The frequency hopping rule includes determining, according to the first indication information and a cyclic descending order of indexes of the available DL RB sets, available DL RB sets corresponding to the multiple PDSCHs scheduled by the DCI in the first format.

A specific example will be taken for description below.

Example III

The DL BWP consists of 5 DL RB sets in total. The 5 DL RB sets include DL RB set 0, DL RB set 1, DL RB set 2, DL RB set 3, and DL RB set 4. Herein, a total of 3 DL RB sets are indicated as "available", and the 3 available RB sets include DL RB set 0, DL RB set 2, and RB set 4.

The DCI in the first format schedules 4 PDSCHs in total, including PDSCH0, PDSCH1, PDSCH2 and PDSCH3.

The network device sends the DCI in the first format to UE, where the DCI in the first format includes the second indication information indicating the frequency hopping rule and the first indication information, and the first indication information is configured to indicate that an index of an available DL RB set where a headmost PDSCH (i.e., PDSCH0), in the multiple PDSCHs scheduled by the DCI in the first format, is located is 2, that is, indicate that the DL RB set where PDSCH0 is located is DL RB set 2.

According to the index of DL RB set 2 and the cyclic descending order of indexes of the available DL RB sets, the DL RB sets corresponding to other PDSCHs are determined in the available DL RB sets in the cyclic ascending order as follows:

PDSCH0 corresponds to DL RB set 2,
PDSCH1 corresponds to DL RB set 0,
PDSCH2 corresponds to DL RB set 4,
PDSCH3 corresponds to DL RB set 2.

Some embodiments of this disclosure provides a method for transmitting PDSCH, which is performed by a network device and includes sending the DCI in the first format to UE, where the DCI in the first format includes first indication information, and the first indication information is configured to indicate an index of a DL RB set where a headmost PDSCH, in the multiple PDSCHs scheduled by the DCI in the first format, is located, and sending, based on multiple available RB sets in the BWP and the frequency hopping rule, the multiple PDSCHs scheduled by the DCI in the first format to UE. The frequency hopping rule includes: determining, according to the first indication information and a cyclic descending order of indexes of the available DL RB sets, available DL RB sets corresponding to the multiple PDSCHs scheduled by the DCI in the first format, and the cyclic descending order of the indexes of the available DL RB sets is a cyclic descending order of the indexes of the available DL RB sets conforming to a first DL RB set interval.

A specific example will be taken for description below.

Example IV

The DL BWP consists of 5 DL RB sets in total. The 5 DL RB sets include DL RB set 0, DL RB set 1, DL RB set 2, DL RB set 3, and DL RB set 4. Herein, a total of 3 DL RB sets are indicated as "available", and the 3 available RB sets include DL RB set 0, DL RB set 2, and RB set 4.

The DCI in the first format schedules 4 PDSCHs in total, including PDSCH0, PDSCH1, PDSCH2 and PDSCH3.

The first DL RB set interval is 1 RB set.

The network device sends the DCI in the first format to UE, where the DCI in the first format includes the second indication information indicating the frequency hopping rule and the first indication information, and the first indication information is configured to indicate that an index of an available DL RB set where a headmost PDSCH (i.e., PDSCH0), in the multiple PDSCHs scheduled by the DCI in the first format, is located is 2, that is, indicate that the DL RB set where PDSCH0 is located is DL RB set 2.

According to the index of DL RB set 2 and the cyclic ascending order of indexes of the available DL RB sets conforming to the first DL RB set interval, the DL RB sets corresponding to other PDSCHs are determined in the available DL RB sets in the cyclic ascending order conforming to the first DL RB set interval as follows:

PDSCH0 corresponds to DL RB set 2,
PDSCH1 corresponds to DL RB set 4,
PDSCH2 corresponds to DL RB set 0,
PDSCH3 corresponds to DL RB set 2.

Some embodiments of this disclosure provides a method for transmitting PDSCH, which is performed by a network device and includes sending the DCI in the first format to UE, where the DCI in the first format includes first indication information, and the first indication information is configured to indicate an index of a DL RB set where a headmost PDSCH, in the multiple PDSCHs scheduled by the DCI in the first format, is located, and sending, based on multiple available RB sets in the BWP and the frequency hopping rule, the multiple PDSCHs scheduled by the DCI in the first format to UE. The frequency hopping rule includes determining, according to the first indication information and a cyclic ascending order of indexes of all DL RB sets in the DL BWP, DL RB sets corresponding to the multiple PDSCHs scheduled by the DCI in the first format, and updating a determined unavailable DL RB set corresponding to a PDSCH to a headmost available DL RB set following the unavailable DL RB set.

A specific example will be taken for description below.

Example V

The DL BWP consists of 5 DL RB sets in total. The 5 DL RB sets include DL RB set 0, DL RB set 1, DL RB set 2, DL RB set 3, and DL RB set 4. Herein, a total of 3 DL RB sets are indicated as "available", and the 3 available RB sets include DL RB set 0, DL RB set 2, and RB set 4.

The DCI in the first format schedules 6 PDSCHs in total, including PDSCH0, PDSCH1, PDSCH2, PDSCH3, PDSCH4 and PDSCH5.

The network device sends the DCI in the first format to UE, where the DCI in the first format includes the second indication information indicating the frequency hopping rule and the first indication information, and the first indication information is configured to indicate that an index of an available DL RB set where a headmost PDSCH (i.e., PDSCH0), in the multiple PDSCHs scheduled by the DCI in the first format, is located is 0, that is, indicate that the DL RB set where PDSCH0 is located is DL RB set 0.

According to the index of DL RB set 0 and the cyclic ascending order of indexes of all the DL RB sets, the DL RB sets corresponding to other PDSCHs are determined in all the DL RB sets in the cyclic ascending order as follows:

PDSCH0 corresponds to DL RB set 0,
PDSCH1 corresponds to DL RB set 1,
PDSCH2 corresponds to DL RB set 2,
PDSCH3 corresponds to DL RB set 3,
PDSCH4 corresponds to DL RB set 4,
PDSCH5 corresponds to DL RB set 0.

Then the determined unavailable DL RB set corresponding to any PDSCH is updated to a headmost available DL RB set following the unavailable DL RB set, and the updated result is as follows:

PDSCH0 corresponds to DL RB set 0,
PDSCH1 corresponds to DL RB set 2,

PDSCH2 corresponds to DL RB set 2,
PDSCH3 corresponds to DL RB set 4,
PDSCH4 corresponds to DL RB set 4,
PDSCH5 corresponds to DL RB set 0.

Some embodiments of this disclosure provides a method for transmitting PDSCH, which is performed by a network device and includes sending the DCI in the first format to UE, where the DCI in the first format includes first indication information, and the first indication information is configured to indicate an index of a DL RB set where a headmost PDSCH, in the multiple PDSCHs scheduled by the DCI in the first format, is located, and sending, based on multiple available RB sets in the BWP and the frequency hopping rule, the multiple PDSCHs scheduled by the DCI in the first format to UE. The frequency hopping rule includes determining, according to the first indication information and a cyclic ascending order of indexes of all DL RB sets in the DL BWP, DL RB sets corresponding to the multiple PDSCHs scheduled by the DCI in the first format, and updating a determined unavailable DL RB set corresponding to a PDSCH to a headmost available DL RB set following the unavailable DL RB set, and the cyclic ascending order of the indexes of the all DL RB sets in the DL BWP is a cyclic ascending order of the indexes of the all DL RB sets conforming to a second DL RB set interval.

A specific example will be taken for description below.

Example VI

The DL BWP consists of 5 DL RB sets in total. The 5 DL RB sets include DL RB set 0, DL RB set 1, DL RB set 2, DL RB set 3, and DL RB set 4. Herein, a total of 3 DL RB sets are indicated as "available", and the 3 available RB sets include DL RB set 0, DL RB set 2, and RB set 4.

The DCI in the first format schedules 6 PDSCHs in total, including PDSCH0, PDSCH1, PDSCH2, PDSCH3, PDSCH4 and PDSCH5.

The second DL RB set interval is 1 DL RB set.

The network device sends the DCI in the first format to UE, where the DCI in the first format includes the second indication information indicating the frequency hopping rule and the first indication information, and the first indication information is configured to indicate that an index of an available DL RB set where a headmost PDSCH (i.e., PDSCH0), in the multiple PDSCHs scheduled by the DCI in the first format, is located is 0, that is, indicate that the DL RB set where PDSCH0 is located is DL RB set 0.

According to the index of DL RB set 0 and the cyclic ascending order of indexes of all the DL RB sets conforming to the second DL RB set interval, the DL RB sets corresponding to other PDSCHs are determined in all the DL RB sets in the cyclic ascending order conforming to the second DL RB set interval as follows:

PDSCH0 corresponds to DL RB set 0,
PDSCH1 corresponds to DL RB set 2,
PDSCH2 corresponds to DL RB set 4,
PDSCH3 corresponds to DL RB set 1,
PDSCH4 corresponds to DL RB set 3,
PDSCH5 corresponds to DL RB set 0.

Then the determined unavailable DL RB set corresponding to any PDSCH is updated to a headmost available DL RB set following the unavailable DL RB set, and the updated result is as follows:

PDSCH0 corresponds to DL RB set 0,
PDSCH1 corresponds to DL RB set 2,
PDSCH2 corresponds to DL RB set 4,
PDSCH3 corresponds to DL RB set 2, PDSCH4 corresponds to DL RB set 4, PDSCH5 corresponds to DL RB set 0.

Some embodiments of this disclosure provides a method for transmitting PDSCH, which is performed by a network device and includes sending the DCI in the first format to UE, where the DCI in the first format includes first indication information, and the first indication information is configured to indicate an index of a DL RB set where a headmost PDSCH, in the multiple PDSCHs scheduled by the DCI in the first format, is located, and sending, based on multiple available RB sets in the BWP and the frequency hopping rule, the multiple PDSCHs scheduled by the DCI in the first format to UE. The frequency hopping rule includes sequentially determining, according to the first indication information and a cyclic descending order of indexes of all DL RB sets in the DL BWP, DL RB sets corresponding to the multiple PDSCHs scheduled by the DCI in the first format, and updating a determined unavailable DL RB set corresponding to a PDSCH to a hindmost available DL RB set preceding the unavailable DL RB set.

Some embodiments of this disclosure provides a method for transmitting PDSCH, which is performed by a network device and includes sending the DCI in the first format to UE, where the DCI in the first format includes first indication information, and the first indication information is configured to indicate an index of a DL RB set where a headmost PDSCH, in the multiple PDSCHs scheduled by the DCI in the first format, is located, and sending, based on multiple available RB sets in the BWP and the frequency hopping rule, the multiple PDSCHs scheduled by the DCI in the first format to UE. The frequency hopping rule includes sequentially determining, according to the first indication information and a cyclic descending order of indexes of all DL RB sets in the DL BWP, DL RB sets corresponding to the multiple PDSCHs scheduled by the DCI in the first format, and updating a determined unavailable DL RB set corresponding to a PDSCH to a hindmost available DL RB set preceding the unavailable DL RB set, and the cyclic descending order of the indexes of the all DL RB sets in the DL BWP is a cyclic descending order of the indexes of the all DL RB sets conforming to a second DL RB set interval.

Some embodiments of this disclosure provides a method for transmitting PDSCH, which is performed by a network device and includes sending, based on multiple available RB sets in the BWP and the frequency hopping rule, the multiple PDSCHs scheduled by the DCI in the first format to UE, where relative frequency-domain positions of different PDSCHs scheduled by the DCI in the first format are the same in respective DL RB sets.

In some embodiments of this disclosure, by configuring the relative frequency-domain positions of different PDSCHs scheduled by the DCI in the first format to be the same in their corresponding DL RB sets, the number of bits used to indicate resource information can be saved in the DCI in the first format sent by the network device 102 to UE 101.

Some embodiments of this disclosure provides a method for transmitting PDSCH, which is performed by a network device and includes sending, based on multiple available RB sets in the BWP and the frequency hopping rule, the multiple PDSCHs scheduled by the DCI in the first format to UE.

The relative frequency-domain positions of different PDSCHs scheduled by the DCI in the first format conform to a predefined rule in their corresponding DL RB sets. For example, the predefined rule includes gradual increasing by a fixed step size. When the step size is 5 RBs, specifically relative frequency-domain positions of PDSCH0 in its corresponding DL RB set are the 1st to 15th, relative frequency-domain positions of PDSCH1 in its corresponding DL RB set are the 6th to 20th, relative frequency-domain positions of PDSCH2 in its corresponding DL RB set are the 11th to 25th, so on and so forth.

In some embodiments of this disclosure, by configuring the relative frequency-domain positions of different PDSCHs scheduled by the DCI in the first format to conform to the predefined rule in their corresponding DL RB sets, the number of bits used to indicate resource information can be saved in the DCI in the first format sent by the network device 102 to UE 101.

Some embodiments of this disclosure provides a method for transmitting PDSCH, which is performed by a network device and includes sending the DCI in the first format to UE, where the DCI in the first format includes first indication information, and the first indication information is configured to indicate an index of a DL RB set where a headmost PDSCH, in the multiple PDSCHs scheduled by the DCI in the first format, is located, and sending, based on multiple available RB sets in the BWP and the frequency hopping rule, the multiple PDSCHs scheduled by the DCI in the first format to UE.

In some embodiments, the relative frequency-domain positions of the different PDSCHs scheduled by the DCI in the first format are the same in their corresponding DL RB sets.

In some embodiments, the relative frequency-domain positions of different PDSCHs scheduled by the DCI in the first format conform to a predefined rule in their corresponding DL RB sets. For example, the predefined rule includes gradual increasing by a fixed step size. When the step size is 5 RBs, specifically relative frequency-domain positions of PDSCH0 in its corresponding DL RB set are the 1st to 15th, relative frequency-domain positions of PDSCH1 in its corresponding DL RB set are the 6th to 20th, relative frequency-domain positions of PDSCH2 in its corresponding DL RB set are the 11th to 25th, and so on and so forth.

In some embodiments of this disclosure, by configuring the relative frequency-domain positions of different PDSCHs scheduled by the DCI in the first format to be the same in their corresponding DL RB sets, the number of bits used to indicate resource information can be saved in the DCI in the first format sent by the network device 102 to UE 101.

Some embodiments of this disclosure provides a method for transmitting PDSCH, which is performed by a network device and includes sending a DCI in a second format, where the DCI in the second format is configured to indicate a usage attribute of each DL RB set in the DL BWP, and the usage attribute is "available" or "unavailable," and sending, based on the frequency hopping rule and multiple available DL RB sets in the DL BWP, the multiple PDSCHs scheduled by the DCI in the first format to UE.

In some embodiments, the DL BWP is located in an unlicensed spectrum.

In some embodiments, the DCI in the second format is DCI 2-0.

Some embodiments of this disclosure provides a method for transmitting PDSCH, which is performed by UE and includes receiving, based on a frequency hopping rule and multiple available DL RB sets in a DL BWP, multiple PDSCHs scheduled by DCI in a first format from a network device.

Some embodiments of this disclosure provides a method for transmitting PDSCH, which is performed by UE and includes determining, based on the frequency hopping rule and multiple available DL RB sets in the DL BWP, positions of resources used for receiving the multiple PDSCHs scheduled by the DCI in the first format, and receiving, at the positions of resources, the multiple PDSCHs scheduled by the DCI in the first format from the network device.

In some embodiments, the positions of resources used for sending the multiple PDSCHs scheduled by the DCI in the first format include multiple positions of resources, and the multiple positions of resources are located in available multiple RB sets.

In some embodiments, the positions of resources used for sending the multiple PDSCHs scheduled by the DCI in the first format include multiple positions of resources, and each position of resource is located in one of the available multiple RB sets.

In some embodiments, the positions of resources are time-frequency positions of resources, and the time-frequency position of resource includes one or more OFDM symbols.

Some embodiments of this disclosure provides a method for transmitting PDSCH, which is performed by UE and includes receiving the DCI in the first format from the network device, where the DCI in the first format includes first indication information, and the first indication information is configured to indicate an index of a DL RB set where a headmost PDSCH, in the multiple PDSCHs scheduled by the DCI in the first format, is located, and receiving, based on multiple available DL RB sets in the BWP and the frequency hopping rule, the multiple PDSCHs scheduled by the DCI in the first format from the network device.

Some embodiments of this disclosure provides a method for transmitting PDSCH, which is performed by UE and includes receiving, based on multiple available DL RB sets in the BWP and the frequency hopping rule, the multiple PDSCHs scheduled by the DCI in the first format from the network device. The frequency hopping rule is indicated by a predefined field in the DCI in the first format.

In some embodiments, UE receives the DCI in the first format from the network device, where the DCI in the first format includes second indication information for indicating the frequency hopping rule.

In some embodiments, the DCI in the first format is DCI 1-0, DCI 1-1 or DCI 1-2.

Some embodiments of this disclosure provides a method for transmitting PDSCH, which is performed by UE and includes receiving, based on multiple available DL RB sets in the BWP and the frequency hopping rule, the multiple PDSCHs scheduled by the DCI in the first format from the network device. The frequency hopping rule is configured by a high-layer signaling.

In some embodiments, UE receives the high-layer signaling from the network device, where the high-layer signaling includes information for indicating the frequency hopping rule.

Some embodiments of this disclosure provides a method for transmitting PDSCH, which is performed by UE and includes receiving, based on multiple available DL RB sets in the BWP and the frequency hopping rule, the multiple PDSCHs scheduled by the DCI in the first format from the network device. The frequency hopping rule is defined in a protocol.

Some embodiments of this disclosure provides a method for transmitting PDSCH, which is performed by UE and includes receiving the DCI in the first format from the network device, where the DCI in the first format includes first indication information, and the first indication information is configured to indicate an index of a DL RB set where a headmost PDSCH, in the multiple PDSCHs scheduled by the DCI in the first format, is located, and receiving, based on multiple available DL RB sets in the BWP and the frequency hopping rule, the multiple PDSCHs scheduled by the DCI in the first format from the network device. The frequency hopping rule includes determining, according to the first indication information and a cyclic ascending order of indexes of the available DL RB sets, available DL RB sets corresponding to the multiple PDSCHs scheduled by the DCI in the first format.

Some embodiments of this disclosure provides a method for transmitting PDSCH, which is performed by UE and includes receiving the DCI in the first format from the network device, where the DCI in the first format includes first indication information, and the first indication information is configured to indicate an index of a DL RB set where a headmost PDSCH, in the multiple PDSCHs scheduled by the DCI in the first format, is located, and receiving, based on multiple available DL RB sets in the BWP and the frequency hopping rule, the multiple PDSCHs scheduled by the DCI in the first format from the network device. The frequency hopping rule includes determining, according to the first indication information and a cyclic descending order of indexes of the available DL RB sets, available DL RB sets corresponding to the multiple PDSCHs scheduled by the DCI in the first format.

Some embodiments of this disclosure provides a method for transmitting PDSCH, which is performed by UE and includes receiving the DCI in the first format from the network device, where the DCI in the first format includes first indication information, and the first indication information is configured to indicate an index of a DL RB set where a headmost PDSCH, in the multiple PDSCHs scheduled by the DCI in the first format, is located, and receiving, based on multiple available DL RB sets in the BWP and the frequency hopping rule, the multiple PDSCHs scheduled by the DCI in the first format from the network device. The frequency hopping rule includes determining, according to the first indication information and a cyclic ascending order of indexes of the available DL RB sets, available DL RB sets corresponding to the multiple PDSCHs scheduled by the DCI in the first format, and the cyclic ascending order of the indexes of the available DL RB sets is a cyclic ascending order of the indexes of the available DL RB sets conforming to a first DL RB set interval.

Some embodiments of this disclosure provides a method for transmitting PDSCH, which is performed by UE and includes receiving the DCI in the first format from the network device, where the DCI in the first format includes first indication information, and the first indication information is configured to indicate an index of a DL RB set where a headmost PDSCH, in the multiple PDSCHs scheduled by the DCI in the first format, is located, and receiving, based on multiple available DL RB sets in the BWP and the frequency hopping rule, the multiple PDSCHs scheduled by the DCI in the first format from the network device. The frequency hopping rule includes: determining, according to the first indication information and a cyclic descending order of indexes of the available DL RB sets, available DL RB sets corresponding to the multiple PDSCHs scheduled by the DCI in the first format, and the cyclic descending order of the indexes of the available DL RB sets is a cyclic descending order of the indexes of the available DL RB sets conforming to a first DL RB set interval.

Some embodiments of this disclosure provides a method for transmitting PDSCH, which is performed by UE and includes receiving the DCI in the first format from the network device, where the DCI in the first format includes first indication information, and the first indication information is configured to indicate an index of a DL RB set where a headmost PDSCH, in the multiple PDSCHs scheduled by the DCI in the first format, is located, and receiving, based on multiple available DL RB sets in the BWP and the frequency hopping rule, the multiple PDSCHs scheduled by the DCI in the first format from the network device. The frequency hopping rule includes determining, according to the first indication information and a cyclic ascending order of indexes of all DL RB sets in the DL BWP, DL RB sets corresponding to the multiple PDSCHs scheduled by the DCI in the first format, and updating a determined unavailable DL RB set corresponding to a PDSCH to a headmost available DL RB set following the unavailable DL RB set.

Some embodiments of this disclosure provides a method for transmitting PDSCH, which is performed by UE and includes receiving the DCI in the first format from the network device, where the DCI in the first format includes first indication information, and the first indication information is configured to indicate an index of a DL RB set where a headmost PDSCH, in the multiple PDSCHs scheduled by the DCI in the first format, is located, and receiving, based on multiple available DL RB sets in the BWP and the frequency hopping rule, the multiple PDSCHs scheduled by the DCI in the first format from the network device. The frequency hopping rule includes sequentially determining, according to the first indication information and a cyclic descending order of indexes of all DL RB sets in the DL BWP, DL RB sets corresponding to the multiple PDSCHs scheduled by the DCI in the first format, and updating a determined unavailable DL RB set corresponding to a PDSCH to a hindmost available DL RB set preceding the unavailable DL RB set.

Some embodiments of this disclosure provides a method for transmitting PDSCH, which is performed by UE and includes receiving the DCI in the first format from the network device, where the DCI in the first format includes first indication information, and the first indication information is configured to indicate an index of a DL RB set where a headmost PDSCH, in the multiple PDSCHs scheduled by the DCI in the first format, is located, and receiving, based on multiple available DL RB sets in the BWP and the frequency hopping rule, the multiple PDSCHs scheduled by the DCI in the first format from the network device. The frequency hopping rule includes determining, according to the first indication information and a cyclic ascending order of indexes of all DL RB sets in the DL BWP, DL RB sets corresponding to the multiple PDSCHs scheduled by the DCI in the first format, and updating a determined unavailable DL RB set corresponding to a PDSCH to a headmost available DL RB set following the unavailable DL RB set, and the cyclic ascending order of the indexes of the all DL RB sets in the DL BWP is a cyclic ascending order of the indexes of the all DL RB sets conforming to a second DL RB set interval.

Some embodiments of this disclosure provides a method for transmitting PDSCH, which is performed by UE and includes receiving the DCI in the first format from the network device, where the DCI in the first format includes first indication information, and the first indication information is configured to indicate an index of a DL RB set where a headmost PDSCH, in the multiple PDSCHs scheduled by the DCI in the first format, is located, and receiving, based on multiple available DL RB sets in the BWP and the frequency hopping rule, the multiple PDSCHs scheduled by the DCI in the first format from the network device. The frequency hopping rule includes sequentially determining, according to the first indication information and a cyclic descending order of indexes of all DL RB sets in the DL BWP, DL RB sets corresponding to the multiple PDSCHs scheduled by the DCI in the first format, and updating a determined unavailable DL RB set corresponding to a PDSCH to a hindmost available DL RB set preceding the unavailable DL RB set, and the cyclic descending order of the indexes of the all DL RB sets in the DL BWP is a cyclic descending order of the indexes of the all DL RB sets conforming to a second DL RB set interval.

Some embodiments of this disclosure provides a method for transmitting PDSCH, which is performed by UE and includes receiving, based on multiple available DL RB sets in the BWP and the frequency hopping rule, the multiple PDSCHs scheduled by the DCI in the first format from the network device. The frequency hopping rule includes relative frequency-domain positions of different PDSCHs scheduled by the DCI in the first format are the same in respective DL RB sets.

Some embodiments of this disclosure provides a method for transmitting PDSCH, which is performed by UE and includes receiving a DCI in a second format, where the DCI in the second format is configured to indicate a usage attribute of each DL RB set in the DL BWP, and the usage attribute is "available" or "unavailable," and receiving, based on the frequency hopping rule and multiple available DL RB sets in the DL BWP, the multiple PDSCHs scheduled by the DCI in the first format from the network device.

Based on the same concept as the above method embodiments, some embodiments of this disclosure further provide a communication device, which may have the functions of the network device 102 in the above method embodiments, and can be configured to perform steps performed by the network device 102 according to the above method embodiments. These functions may be implemented by hardware, or may be implemented by software or by hardware executing corresponding software. The hardware or software includes one or more modules corresponding to the above functions.

Based on the same concept as the above method embodiments, some embodiments of this disclosure further provide a communication device, which may have the functions of the network device 102 in the above method embodiments, and can be configured to perform steps performed by the network device 102 according to the above method embodiments. These functions may be implemented by hardware, or may be implemented by software or by hardware executing corresponding software. The hardware or software includes one or more modules corresponding to the above functions.

In some embodiments, the communication device 300 shown in FIG. 3 may be used as the network device involved in the above method embodiments, and perform the steps performed by the network device in the above method embodiments. As shown in FIG. 3, the communication device 300 may include a transceiver module 301 and a processing module 302, where the transceiver module 301 and the processing module 302 are coupled to each other. The transceiver module 301 may be configured to support communications of the communication device 300, and the transceiver module 301 may have a wireless communication function, for example, may perform wireless communication with other communication devices through a wireless air interface. The processing module 302 may be configured to support processing actions performed by the communication device 300 according to the above method embodiments, including but not limited to: generating information and messages sent by the transceiver module 301, and/or demodulating and decoding the signals received by the transceiver module 301, and so on.

When performing the steps implemented by the network device 102, the transceiver module 301 is configured to send, based on the frequency hopping rule and multiple available DL RB sets in the DL BWP, the multiple PDSCHs scheduled by the DCI in the first format to UE.

Optionally, the method includes sending the DCI in the first format to UE, where the DCI in the first format includes first indication information, and the first indication information is configured to indicate an index of a DL RB set where a headmost PDSCH, in the multiple PDSCHs scheduled by the DCI in the first format, is located.

Optionally, the frequency hopping rule is indicated by a predefined field in the DCI in the first format, or the frequency hopping rule is configured by a high-layer signaling, or the frequency hopping rule is defined in a protocol.

Optionally, the frequency hopping rule includes determining, according to the first indication information and a cyclic ascending order of indexes of the available DL RB sets, available DL RB sets corresponding to the multiple PDSCHs scheduled by the DCI in the first format, or, determining, according to the first indication information and a cyclic descending order of indexes of the available DL RB sets, available DL RB sets corresponding to the multiple PDSCHs scheduled by the DCI in the first format.

Optionally, the cyclic ascending order of the indexes of the available DL RB sets is a cyclic ascending order of the indexes of the available DL RB sets conforming to a first DL RB set interval, the cyclic descending order of the indexes of the available DL RB sets is a cyclic descending order of the indexes of the available DL RB sets conforming to a first DL RB set interval.

Optionally, the frequency hopping rules include determining, according to the first indication information and a cyclic ascending order of indexes of all DL RB sets in the DL BWP, DL RB sets corresponding to the multiple PDSCHs scheduled by the DCI in the first format, and updating a determined unavailable DL RB set corresponding to a PDSCH to a headmost available DL RB set following the unavailable DL RB set, or, sequentially determining, according to the first indication information and a cyclic descending order of indexes of all DL RB sets in the DL BWP, DL RB sets corresponding to the multiple PDSCHs scheduled by the DCI in the first format, and updating a determined unavailable DL RB set corresponding to a PDSCH to a hindmost available DL RB set preceding the unavailable DL RB set.

Optionally, the cyclic ascending order of the indexes of the all DL RB sets in the DL BWP is a cyclic ascending order of the indexes of the all DL RB sets conforming to a second DL RB set interval. The cyclic descending order of the indexes of the all DL RB sets in the DL BWP is a cyclic descending order of the indexes of the all DL RB sets conforming to a second DL RB set interval.

Optionally, the frequency hopping rule includes relative frequency-domain positions of different PDSCHs scheduled by the DCI in the first format are the same in respective DL RB sets.

Optionally, the method includes sending DCI in a second format, where the DCI in the second format is configured to indicate a usage attribute of each DL RB set in the DL BWP, and the usage attribute is "available" or "unavailable."

Figure 4:
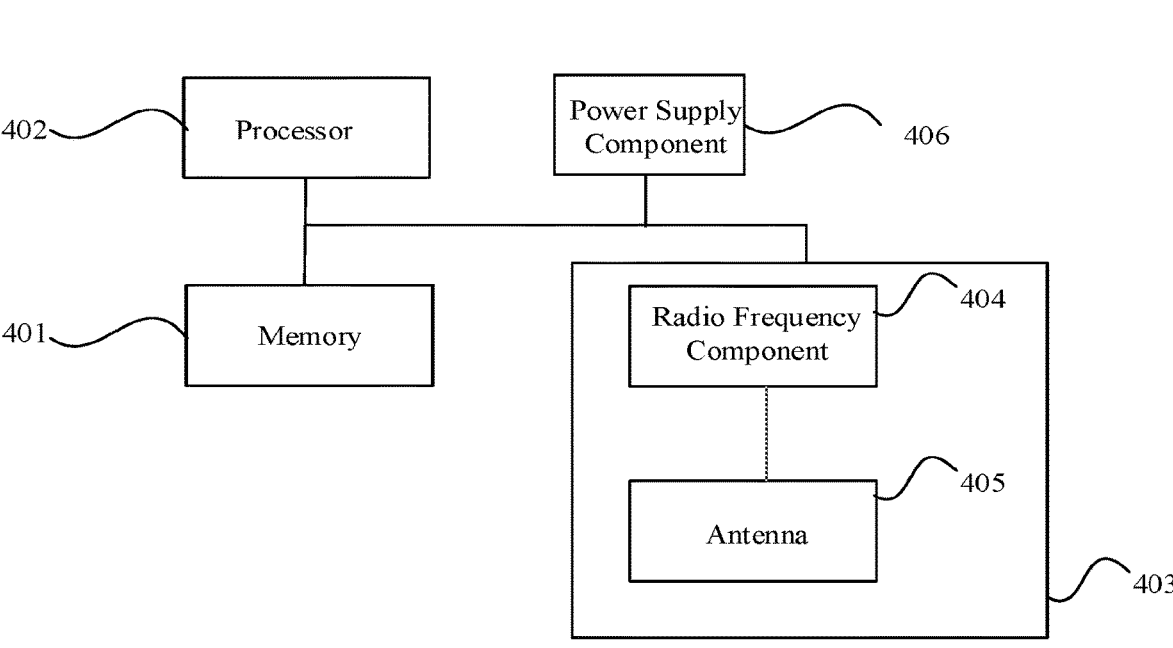
FIG. 4 is a block diagram of another apparatus for transmitting PDSCH according to an exemplary embodiment.

When the communication device is the network device 102, its structure may also be as shown in FIG. 4. The configuration of the communication device will be described by taking a base station as an example. As shown in FIG. 4, the apparatus 400 includes a memory 401, a processor 402, a transceiver component 403, and a power supply component 406. The memory 401 is coupled with the processor 402, and may be configured to store programs and data necessary for the communication device 400 to realize various functions. The processor 402 is configured to support the communication device 400 to perform the corresponding functions in the above-mentioned methods, and the functions can be implemented by invoking programs stored in the memory 401. The transceiver component 403 may be a wireless transceiver, and may be configured to support the communication device 400 to receive signaling and/or data, and to transmit signaling and/or data through a wireless air interface. The transceiver component 403 may also be referred to as a transceiver unit or a communication unit, and the transceiver component 403 may include a radio frequency component 404 and one or more antennas 405. The radio frequency component 404 may be a remote radio unit (RRU), and may be specifically used for the transmission of radio frequency signals and conversion between radio frequency signals and baseband signals. The one or more antennas 405 may be specifically used for radiation and reception of radio frequency signals.

When the communication device 400 needs to send data, the processor 402 may carry out baseband processing on the data to be sent, and output the baseband signal to the radio frequency unit. The radio frequency unit carries out the radio frequency processing on the baseband signal and sends the radio frequency signal through the antenna in the form of electromagnetic waves. When data is sent to the communication device 400, the radio frequency unit receives the radio frequency signal through the antenna, converts the radio frequency signal into the baseband signal, and outputs the baseband signal to the processor 402. Then the processor 402 converts the baseband signal into data and process the data.

Based on the same concept as the above method embodiments, some embodiments of this disclosure further provide a communication device, which may have the functions of UE 101 in the above method embodiments, and can be configured to perform steps performed by UE 101 according to the above method embodiments. These functions may be implemented by hardware, or may be implemented by software or by hardware executing corresponding software. The hardware or software includes one or more modules corresponding to the above functions.

Figures 5, 6:
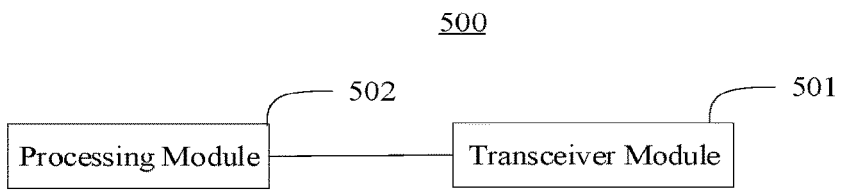
FIG. 5 is a block diagram of another apparatus for transmitting PDSCH according to an exemplary embodiment.
FIG. 6 is a block diagram of another apparatus for transmitting PDSCH according to an exemplary embodiment.

In some embodiments, the communication device 500 shown in FIG. 5 may be used as UE involved in the above method embodiments, and perform the steps performed by UE in the above method embodiments. As shown in FIG. 5, the communication device 500 may include a transceiver module 501 and a processing module 502, where the transceiver module 501 and the processing module 502 are coupled to each other. The transceiver module 501 may be configured to support communications of the communication device 500, and the transceiver module 501 may have a wireless communication function, for example, may perform wireless communication with other communication devices through a wireless air interface. The processing module 502 may be configured to support processing actions performed by the communication device 500 according to the above method embodiments, including but not limited to: generating information and messages sent by the transceiver module 501, and/or demodulating and decoding the signals received by the transceiver module 501, and so on.

When performing the steps implemented by UE 101, the transceiver module 501 is configured to receive, based on the frequency hopping rule and multiple available DL RB sets in the DL BWP, the multiple PDSCHs scheduled by the DCI in the first format from a network device.

Optionally, the method includes receiving the DCI in the first format from the network device, where the DCI in the first format includes first indication information, and the first indication information is configured to indicate an index of a DL RB set where a headmost PDSCH, in the multiple PDSCHs scheduled by the DCI in the first format, is located.

Optionally, the frequency hopping rule is indicated by a predefined field in the DCI in the first format, or the frequency hopping rule is configured by a high-layer signaling, or the frequency hopping rule is defined in a protocol.

Optionally, the frequency hopping rule includes determining, according to the first indication information and a cyclic ascending order of indexes of the available DL RB sets, available DL RB sets corresponding to the multiple PDSCHs scheduled by the DCI in the first format, or, determining, according to the first indication information and a cyclic descending order of indexes of the available DL RB sets, available DL RB sets corresponding to the multiple PDSCHs scheduled by the DCI in the first format.

Optionally, the cyclic ascending order of the indexes of the available DL RB sets is a cyclic ascending order of the indexes of the available DL RB sets conforming to a first DL RB set interval. The cyclic descending order of the indexes of the available DL RB sets is a cyclic descending order of the indexes of the available DL RB sets conforming to a first DL RB set interval.

Optionally, the frequency hopping rules include:

determining, according to the first indication information and a cyclic ascending order of indexes of all DL RB sets in the DL BWP, DL RB sets corresponding to the multiple PDSCHs scheduled by the DCI in the first format, and updating a determined unavailable DL RB set corresponding to a PDSCH to a headmost available DL RB set following the unavailable DL RB set;

or, sequentially determining, according to the first indication information and a cyclic descending order of indexes of all DL RB sets in the DL BWP, DL RB sets corresponding to the multiple PDSCHs scheduled by the DCI in the first format, and updating a determined unavailable DL RB set corresponding to a PDSCH to a hindmost available DL RB set preceding the unavailable DL RB set.

Optionally, the cyclic ascending order of the indexes of the all DL RB sets in the DL BWP is a cyclic ascending order of the indexes of the all DL RB sets conforming to a second DL RB set interval;

the cyclic descending order of the indexes of the all DL RB sets in the DL BWP is a cyclic descending order of the indexes of the all DL RB sets conforming to a second DL RB set interval.

Optionally, the frequency hopping rule includes:

relative frequency-domain positions of different PDSCHs scheduled by the DCI in the first format are the same in respective DL RB sets.

Optionally, the method includes:

receiving DCI in a second format, where the DCI in the second format is configured to indicate a usage attribute of each DL RB set in the DL BWP, and the usage attribute is "available" or "unavailable".

It should be understood that the specific process of each module performing the above-mentioned corresponding steps has been described in detail in the above-mentioned method embodiments, and for the sake of brevity, it will not be repeated here.

When the communication device is UE 101, its structure may also be as shown in FIG. 6. Apparatus 600 may be a mobile phone, computer, digital broadcast terminal, messaging device, game console, tablet device, medical device, fitness device, personal digital assistant, and the like. Referring to FIG. 6, the apparatus 600 may include one or more of the following components: a processing component 602, a memory 604, a power supply component 606, a multimedia component 608, an audio component 610, an input/output (I/O) interface 612, a sensor component 614, and a communication component 616.

The processing component 602 generally controls the overall operation of the apparatus 600, such as operations associated with display, phone calls, data communications, camera operations, and recording operations. The processing component 602 may include one or more processors 620 to execute instructions to perform all or some of the steps of the methods described above. Additionally, the processing component 602 may include one or more modules that facilitate interaction between the processing component 602 and other components. For example, the processing component 602 may include a multimedia module to facilitate interaction between the multimedia component 608 and the processing component 602.

Memory 604 is configured to store various types of data to support operation at the apparatus 600. Examples of such data include instructions for any application or method operating on the apparatus 600, contact data, phonebook data, messages, pictures, videos, and the like. Memory 604 may be implemented by any type of volatile or nonvolatile storage device or combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic or optical disk.

Power supply component 606 provides power to the various components of the apparatus 600. Power supply component 606 may include a power management system, one or more power supplies, and other components associated with generating, managing, and distributing power to the apparatus 600.

Multimedia component 608 includes screens that provide an output interface between the apparatus 600 and the user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touch, swipe, and gestures on the touch panel. The touch sensor may not only sense the boundaries of a touch or swipe action, but also detect the duration and pressure associated with the touch or swipe action.

Audio component 610 is configured to output and/or input audio signals. For example, audio component 610 includes a microphone (MIC) that is configured to receive external audio signals when the apparatus 600 is in operating modes, such as call mode, recording mode, and voice recognition mode.

I/O interface 612 provides an interface between the processing component 602 and a peripheral interface module, which may be a keyboard, a click wheel, a button, or the like.

These buttons may include, but are not limited to: home button, volume buttons, start button, and lock button.

Sensor component 614 includes one or more sensors for providing status assessment of various aspects of the apparatus 600. For example, the sensor component 614 can detect the on/off state of the apparatus 600, the relative positioning of components, such as the display and keypad of the apparatus 600. The sensor component 614 can also detect a change in the position of the apparatus 600 or a component of the apparatus 600, the presence or absence of user contact with the apparatus 600, the orientation or acceleration/deceleration of the apparatus 600, and the temperature change of the apparatus 600.

Communication component 616 is configured to facilitate wired or wireless communication between the apparatus 600 and other devices. The apparatus 600 may access wireless networks based on any communication standard, such as WiFi, 2G or 3G, or a combination thereof.

In some embodiments, the apparatus 600 may be implemented by one or more application specific integrated circuits (ASICs), digital signal processors (DSPs), digital signal processing devices (DSPDs), programmable logic devices (PLDs), field programmable gate array (FPGA), controller, microcontroller, microprocessor or other electronic component, which may be configured to perform the above method.

In some embodiments, there is also provided a non-transitory computer-readable storage medium including instructions, such as a memory 604 including instructions. The instructions are executable by the processor 620 of the apparatus 600 to perform the method described above. For example, the non-transitory computer-readable storage medium may be ROM, random access memory (RAM), CD-ROM, magnetic tape, floppy disk, optical data storage device, and the like.

Other implementations of the disclosed embodiments will readily occur to those skilled in the art upon consideration of the specification and practice of some embodiments disclosed herein. This disclosure is intended to cover any variations, uses, or adaptations of the disclosed embodiments that follow the general principles of the disclosed embodiments and include common general knowledge or conventional technical means in the art not disclosed in this disclosure. The specification and examples are to be regarded as exemplary only, with the actual scope and spirit of embodiments of this disclosure being indicated by the following claims.

It should be understood that some embodiments of this disclosure are not limited to the precise structures described above and illustrated in the accompanying drawings, and that various modifications and changes may be made without departing from the scope thereof. The scope of embodiments of this disclosure is limited only by the appended claims.

INDUSTRIAL APPLICABILITY

The multiple PDSCHs scheduled by the DCI in the first format are sent to UE only on the multiple available DL RB sets in the BWP, and the multiple PDSCHs are respectively mapped to the multiple available RB sets in the BWP based on the frequency hopping rule, thereby avoiding the situation that the PDSCH is mapped to an unavailable RB set according to the frequency hopping rule, so that UE 101 can smoothly receive the multiple PDSCHs scheduled by a single DCI and processed by frequency hopping.

What is claimed is:

1. A method for transmitting physical downlink shared channel (PDSCH), comprising:

sending, by a network device, downlink control information (DCI) in a first format to a user equipment (UE), wherein the DCI in the first format comprises first indication information, and the first indication information is configured to indicate an index of a DL RB set where a headmost PDSCH, in multiple PDSCHs scheduled by the DCI in the first format, is located; and sending, by the network device based on a frequency hopping rule and multiple available downlink (DL) resource block (RB) sets in a DL bandwidth part (BWP), the multiple PDSCHs scheduled by the DCI in the first format to the UE;

wherein the frequency hopping rule comprises:

determining, according to the first indication information and a cyclic ascending order of indexes of available DL RB sets, the available DL RB sets corresponding to the multiple PDSCHs scheduled by the DCI in the first format;

or, determining, according to the first indication information and a cyclic descending order of indexes of available DL RB sets, the available DL RB sets corresponding to the multiple PDSCHs scheduled by the DCI in the first format;

or, wherein the frequency hopping rule comprises:

determining, according to the first indication information and a cyclic ascending order of indexes of all DL RB sets in the DL BWP, DL RB sets corresponding to the multiple PDSCHs scheduled by the DCI in the first format, and updating a determined unavailable DL RB set corresponding to a PDSCH to a headmost available DL RB set following the unavailable DL RB set; or determining, according to the first indication information and a cyclic descending order of indexes of all DL RB sets in the DL BWP, DL RB sets corresponding to the multiple PDSCHs scheduled by the DCI in the first format, and updating a determined unavailable DL RB set corresponding to a PDSCH to a hindmost available DL RB set preceding the unavailable DL RB set.

2. The method according to claim 1, wherein, the frequency hopping rule is indicated by a predefined field in the DCI in the first format; or the frequency hopping rule is configured by a high-layer signaling; or the frequency hopping rule is defined in a protocol.

3. The method according to claim 1, wherein, the cyclic ascending order of the indexes of the available DL RB sets is conforming to a first DL RB set interval;

the cyclic descending order of the indexes of the available DL RB sets is conforming to a first DL RB set interval.

4. The method according to claim 1, wherein, the cyclic ascending order of the indexes of the all DL RB sets in the DL BWP is conforming to a second DL RB set interval;

the cyclic descending order of the indexes of the all DL RB sets in the DL BWP is conforming to a second DL RB set interval.

5. The method according to claim 1, wherein the frequency hopping rule comprises:

relative frequency-domain positions of different PDSCHs scheduled by the DCI in the first format are the same in respective DL RB sets.

6. The method according to claim 1, further comprising:

sending DCI in a second format, wherein the DCI in the second format is configured to indicate a usage attribute of each DL RB set in the DL BWP, and the usage attribute is "available" or "unavailable".

7. A method for transmitting physical downlink shared channel (PDSCH), comprising:

receiving downlink control information (DCI) in a first format from a network device, wherein the DCI in the first format comprises first indication information, and the first indication information is configured to indicate an index of a DL RB set where a headmost PDSCH, in multiple PDSCHs scheduled by the DCI in the first format, is located; and receiving, by a user equipment (UE) based on a frequency hopping rule and multiple available downlink (DL) resource block (RB) sets in a DL bandwidth part (BWP), the multiple PDSCHs scheduled by the DCI in the first format from the network device;

wherein the frequency hopping rule comprises:

determining, according to the first indication information and a cyclic ascending order of indexes of available DL RB sets, the available DL RB sets corresponding to the multiple PDSCHs scheduled by the DCI in the first format;

or, determining, according to the first indication information and a cyclic descending order of indexes of available DL RB sets, the available DL RB sets corresponding to the multiple PDSCHs scheduled by the DCI in the first format;

or, wherein the frequency hopping rule comprises:

determining, according to the first indication information and a cyclic ascending order of indexes of all DL RB sets in the DL BWP, DL RB sets corresponding to the multiple PDSCHs scheduled by the DCI in the first format, and updating a determined unavailable DL RB set corresponding to a PDSCH to a headmost available DL RB set following the unavailable DL RB set; or, determining, according to the first indication information and a cyclic descending order of indexes of all DL RB sets in the DL BWP, DL RB sets corresponding to the multiple PDSCHs scheduled by the DCI in the first format, and updating a determined unavailable DL RB set corresponding to a PDSCH to a hindmost available DL RB set preceding the unavailable DL RB set.

8. The method according to claim 7, wherein, the frequency hopping rule is indicated by a predefined field in the DCI in the first format; or the frequency hopping rule is configured by a high-layer signaling; or the frequency hopping rule is defined in a protocol.

9. The method according to claim 7, wherein, the cyclic ascending order of the indexes of the available DL RB sets is conforming to a first DL RB set interval;

the cyclic descending order of the indexes of the available DL RB sets is conforming to a first DL RB set interval.

10. The method according to claim 7, wherein, the cyclic ascending order of the indexes of the all DL RB sets in the DL BWP is conforming to a second DL RB set interval;

the cyclic descending order of the indexes of the all DL RB sets in the DL BWP is conforming to a second DL RB set interval.

11. The method according to claim 7, wherein the frequency hopping rule comprises:

relative frequency-domain positions of different PDSCHs scheduled by the DCI in the first format are the same in respective DL RB sets.

12. The method according to claim 7, further comprising:

receiving DCI in a second format, wherein the DCI in the second format is configured to indicate a usage attribute of each DL RB set in the DL BWP, and the usage attribute is "available" or "unavailable".

13. A user equipment (UE), comprising a processor and a memory; wherein the memory is configured to store a computer program; and the processor is configured to execute the computer program, thereby implementing the method according to claim 7.

14. A network device, comprising a processor and a memory; wherein the memory is configured to store a computer program; and the processor is configured to execute the computer program, thereby implementing actions comprising:

sending downlink control information (DCI) in a first format to a user equipment (UE), wherein the DCI in the first format comprises first indication information, and the first indication information is configured to indicate an index of a DL RB set where a headmost PDSCH, in multiple PDSCHs scheduled by the DCI in the first format, is located; and sending, based on a frequency hopping rule and multiple available downlink (DL) resource block (RB) sets in a DL bandwidth part (BWP), the multiple PDSCHs scheduled by the DCI in the first format to the UE;

wherein the frequency hopping rule comprises:

determining, according to the first indication information and a cyclic ascending order of indexes of available DL RB sets, the available DL RB sets corresponding to the multiple PDSCHs scheduled by the DCI in the first format;

or, determining, according to the first indication information and a cyclic descending order of indexes of available DL RB sets, the available DL RB sets corresponding to the multiple PDSCHs scheduled by the DCI in the first format;

or, wherein the frequency hopping rule comprises:

determining, according to the first indication information and a cyclic ascending order of indexes of all DL RB sets in the DL BWP, DL RB sets corresponding to the multiple PDSCHs scheduled by the DCI in the first format, and updating a determined unavailable DL RB set corresponding to a PDSCH to a headmost available DL RB set following the unavailable DL RB set; or, determining, according to the first indication information and a cyclic descending order of indexes of all DL RB sets in the DL BWP, DL RB sets corresponding to the multiple PDSCHs scheduled by the DCI in the first format, and updating a determined unavailable DL RB set corresponding to a PDSCH to a hindmost available DL RB set preceding the unavailable DL RB set.

* * * * *